(12) United States Patent
Batariere et al.

(10) Patent No.: US 7,664,091 B2
(45) Date of Patent: Feb. 16, 2010

(54) METHOD AND APPARATUS FOR CONTROL CHANNEL TRANSMISSION AND RECEPTION

(75) Inventors: Mickael D. Batariere, Schaumburg, IL (US); Brian K. Classon, Palatine, IL (US); Mark C. Cudak, Rolling meadows, IL (US); Philippe J. Sartori, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 556 days.

(21) Appl. No.: 11/242,254

(22) Filed: Oct. 3, 2005

(65) Prior Publication Data
US 2007/0076677 A1    Apr. 5, 2007

(51) Int. Cl.
*H04B 7/208* (2006.01)
(52) U.S. Cl. .................................... 370/344; 370/208
(58) Field of Classification Search ......... 370/328–338, 370/343–344, 395.4, 468, 469
See application file for complete search history.

(56) References Cited

U.S. PATENT DOCUMENTS

| | | | |
|---|---|---|---|
| 4,491,947 A | | 1/1985 | Frank |
| 6,031,826 A | * | 2/2000 | Hassan ....................... 370/321 |
| 6,097,772 A | * | 8/2000 | Johnson et al. ............. 375/346 |
| 6,243,580 B1 | | 6/2001 | Garner |
| 6,347,391 B1 | * | 2/2002 | Uesugi et al. ............... 714/795 |
| 6,549,772 B1 | * | 4/2003 | Chavez et al. ............ 455/422.1 |
| 6,574,211 B2 | | 6/2003 | Padovani et al. |
| 6,697,422 B1 | * | 2/2004 | Mathai ....................... 375/222 |
| 6,751,187 B2 | | 6/2004 | Walton et al. |
| 2002/0032030 A1 | * | 3/2002 | Berglund et al. ............ 455/434 |
| 2003/0152169 A1 | * | 8/2003 | Chen ........................... 375/340 |
| 2004/0082333 A1 | * | 4/2004 | Ito et al. ...................... 455/450 |
| 2005/0025101 A1 | * | 2/2005 | Paneth et al. ................. 370/336 |
| 2005/0147078 A1 | * | 7/2005 | Arima et al. ................. 370/349 |
| 2005/0254442 A1 | * | 11/2005 | Proctor et al. ................ 370/294 |
| 2006/0072520 A1 | * | 4/2006 | Chitrapu et al. ............. 370/337 |
| 2007/0025468 A1 | * | 2/2007 | Li ................................ 375/308 |
| 2008/0040105 A1 | * | 2/2008 | Wang et al. .................. 704/221 |
| 2008/0062912 A1 | * | 3/2008 | Tiedemann et al. ......... 370/318 |
| 2008/0232291 A1 | * | 9/2008 | Hus et al. .................... 370/312 |

* cited by examiner

*Primary Examiner*—Steven H Nguyen
*Assistant Examiner*—Kenan Cehic

(57) ABSTRACT

A method and apparatus for control channel transmission and reception is provided herein. In particular, the use of a partitioned and structured control channel is provided that leverages the benefits of common control while maintaining favorable aspects of dedicated control. During operation, control information is distributed over a number of partitions (201). Each $P_i$ is encoded (607) with monotonically non-increasing reliability level. Control information for a given remote unit can be distributed on one or several partitions, from $P_1$ to $P_k$, where $P_k$ is encoded with the lowest reliability level that can be decodable by the remote unit at an acceptable error rate.

13 Claims, 5 Drawing Sheets

100

104

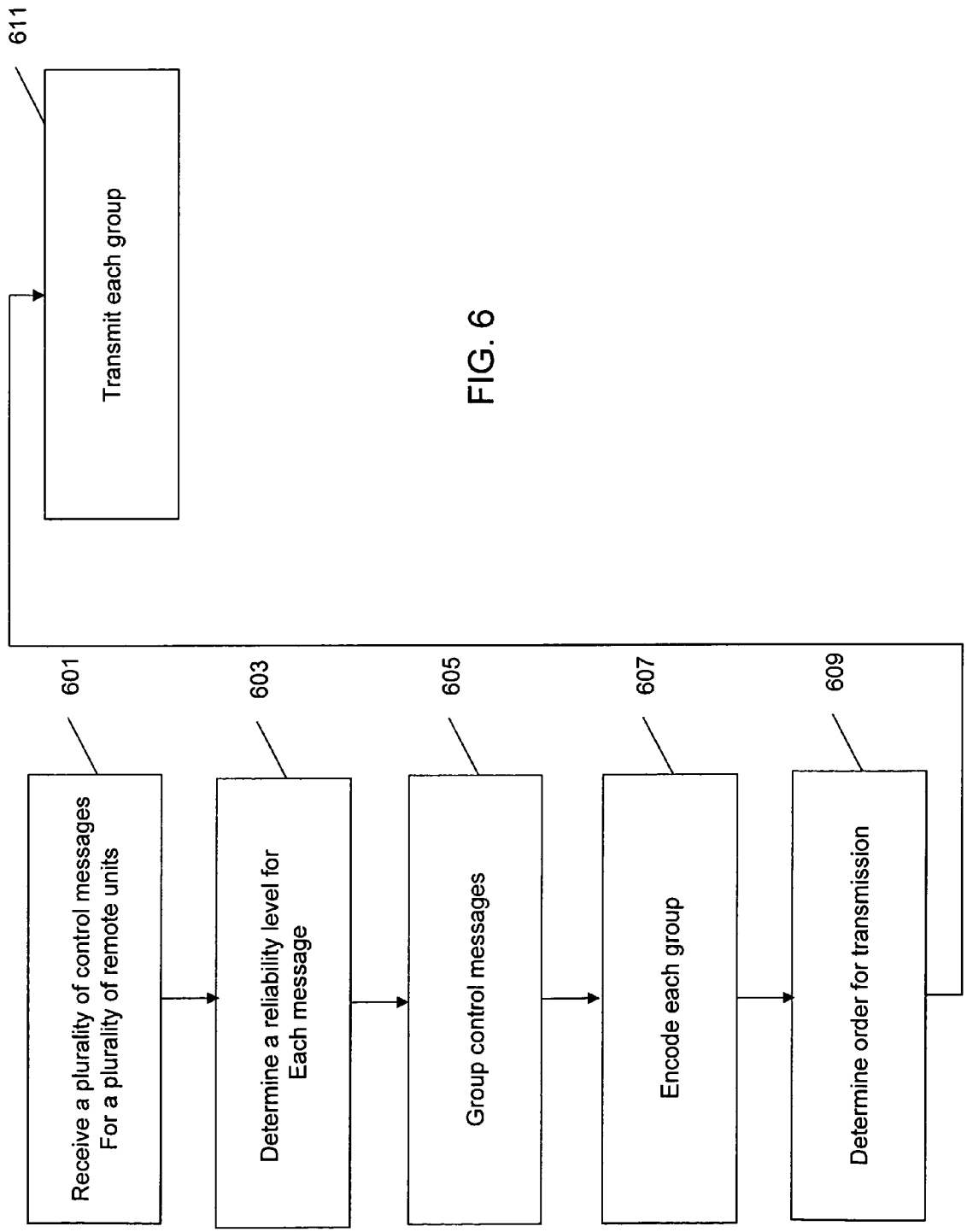

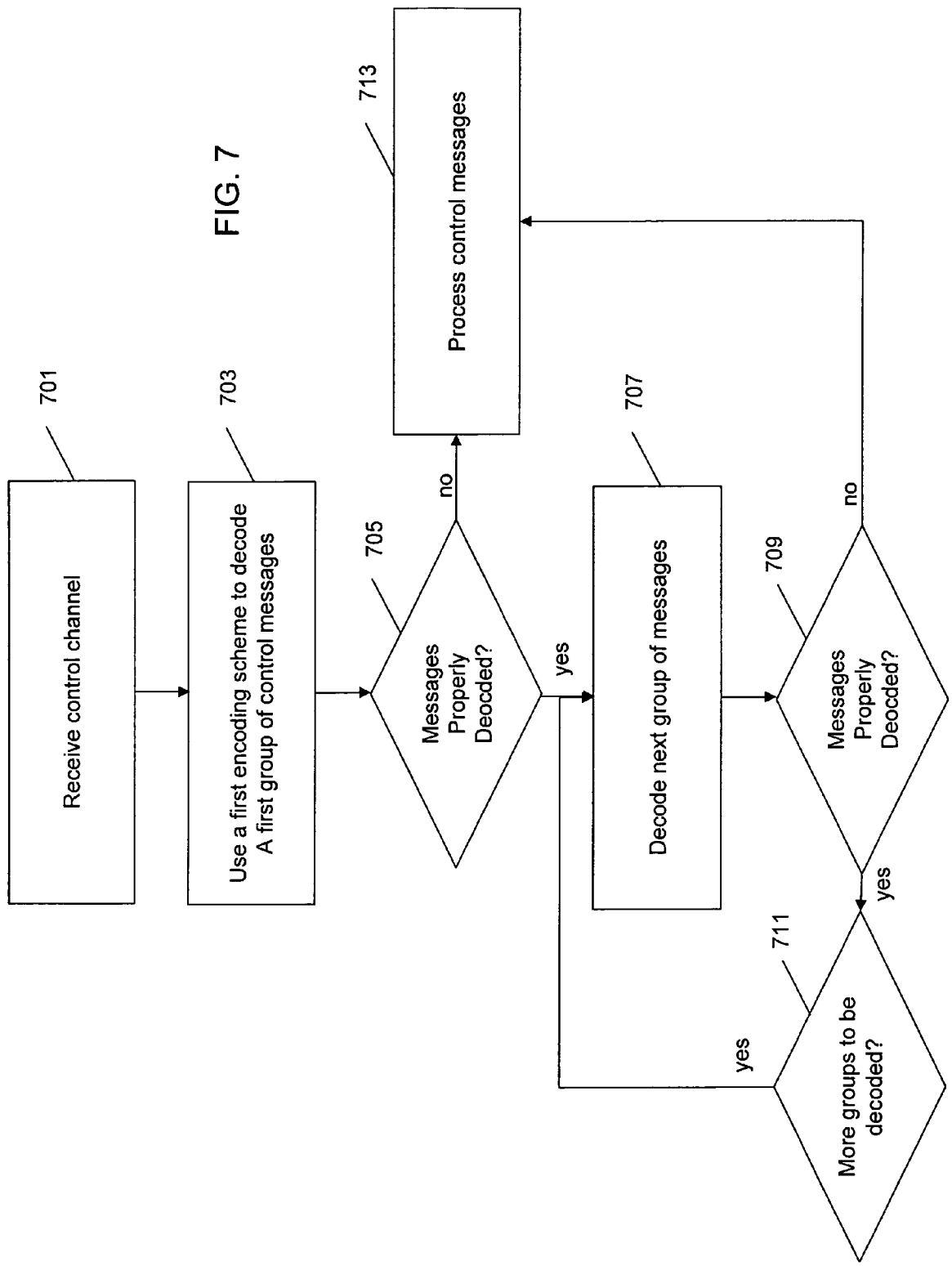

METHOD AND APPARATUS FOR CONTROL CHANNEL TRANSMISSION AND RECEPTION

FIELD OF THE INVENTION

The present invention relates generally to control channel transmission and reception and in particular, to a method and apparatus for control channel transmission and reception within a communication system.

BACKGROUND OF THE INVENTION

Communication systems typically employ control channels to transmit information such as resource allocation assignment messages and other signaling messages. Modern cellular systems currently under development support a wide variety of options and modes, and utilize advanced physical layer and MAC layer techniques. For instance, in the IEEE 802.16e standard, there are multiple frame sizes, coding schemes, or optional antenna modes. The resource allocation can use a frequency-diversity or a frequency-selective assignment policy. While all these techniques have the potential of significantly improving the system performance of communication systems, they also require a lot of additional signaling. Because of this additional signaling, the amount of resources allocated to the control channel needs to be significantly higher than for existing systems.

An imprudent control channel design can bring the amount of overhead needed for the control information to unreasonably large values. In some cases, increasing the control channel size to support an option might offset all the gains (in terms of spectral efficiency) of that particular option, or could even reduce spectral efficiency. Therefore there is a need for a method and apparatus for control channel transmission and reception that efficiently controls channels and offers the necessary flexibility to support multiple options while occupying a limited amount of physical resource.

BRIEF DESCRIPTION OF THE DRAWINGS

FIG. 6 is a flow chart showing operation of the base station of FIG. 3.

FIG. 7 is a flow chart showing operation of the remote unit of FIG. 4.

DETAILED DESCRIPTION OF THE DRAWINGS

Figure 1:
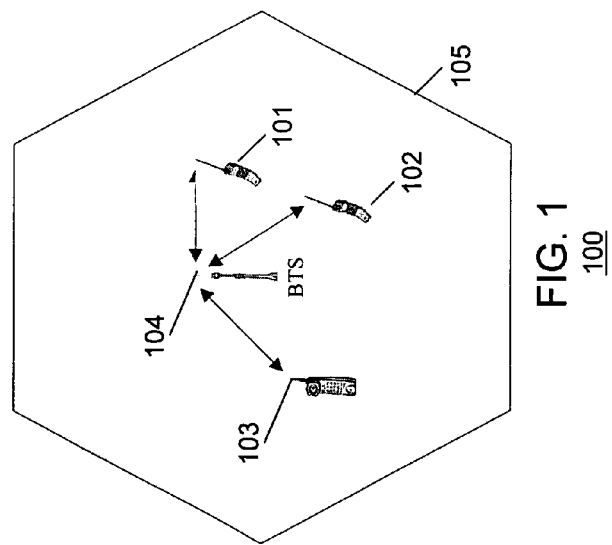
FIG. 1 is a block diagram of a communication system.

In order to address the above-mentioned need, a method and apparatus for control channel transmission and reception is provided herein. In particular, the use of a partitioned and structured control channel (PSCCH) is provided that leverages the benefits of a common control channel while maintaining favorable aspects of dedicated control. During operation, control information is distributed over a number of frequency and/or time partitions $P_i$ with $1 \leq i \leq N$. Each $P_i$ is encoded with monotonically non-increasing reliability level. There are at least two partitions having two reliability levels, and/or two different modulations or coding or power levels to be used for control channel transmission.

Control information for a given remote unit can be distributed on one or several partitions, from $P_1$ to $P_k$, where $P_k$ is encoded with the lowest reliability level that can be decodable by the remote unit at an acceptable error rate. A reliability level is defined as a combination of a channel coding rate of a modulation and of a transmission power level. The reliability level may also be associated with a repetition factor or spreading factor. An order is defined on the reliability level such as if message A is encoded with a higher reliability level than message B, message A can be decoded in harsher RF channel conditions (e.g., at a lower SNR).

The Partitioned Structured Control Channel allows the system to communicate control information at different reliability levels within a same frame. It also enables efficiency enhancing techniques such as power stealing and interference avoidance. Additionally, the overhead is significantly reduced as compared with other control channel transmission techniques.

The present invention encompasses a method comprising the steps of producing a plurality of control messages that need to be transmitted to a plurality of remote units within a frame of a control channel, determining a reliability level for each control message, and grouping control messages having a similar reliability level to produce a plurality of grouped control messages. Each group is encoded such that at least two groups are encoded with a different encoding scheme, and then an order is determined for transmitting the encoded groups. Finally, the encoded groups are transmitted a control channel having the determined order within the frame.

The present invention additionally encompasses a method comprising the steps of receiving a control channel transmission over a control channel, the control channel transmission comprising a plurality of partitions, with each partition containing groups of messages such that least two of the groups of messages have differing encoding, modulation, and/or power levels. A first encoding scheme is used to decode a group of messages, and a second encoding scheme is used to decode a second group of messages.

The present invention additionally encompasses an apparatus that comprises a reliability assigner receiving a plurality of control messages that need to be transmitted to a plurality of remote units within a frame of a control channel, and determining a reliability level for each control message. The apparatus additionally comprises ordering circuitry grouping control messages having a similar reliability level to produce a plurality of grouped control messages, an encoder encoding each group wherein at least two groups are encoded with a different encoding scheme, and a transmitter determining an order for transmission of the encoded groups and transmitting the encoded groups on a control channel having the determined order within the frame.

The present invention additionally encompasses an apparatus that comprises a receiver receiving a control channel transmission over a control channel, the control channel transmission comprising a plurality of partitions, with each partition containing groups of messages, at least two of the groups of messages having differing encoding, modulation, and/or power levels. The apparatus additionally comprises a decoder using a first encoding scheme to decode a group of messages and using a second encoding scheme to decode a second group of messages.

Turning now to the drawings, wherein like numerals designate like components, FIG. 1 is a block diagram of communication system 100. Communication system 100 comprises a plurality of cells 105 (only one shown) each having a base transceiver station (BTS, or base station) 104 in communication with a plurality of remote, stationary or mobile units 101-103. In the preferred embodiment of the present invention, communication system 100 utilizes a communication system protocol using Adaptive Modulation and Coding (AMC) with Orthogonal Frequency Division Multiplexing (OFDM). The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. However, in alternate embodiments communication system 100 may utilize other wideband cellular communication system protocols such as, but not limited to, TDMA or direct sequence CDMA.

As discussed, communication system 100 may utilize different modulation and coding formats for transmission of data, either payload data or control data. The payload data may utilize Adaptive Modulation and Coding (AMC). With AMC, the modulation and coding format of a data transmission for a particular receiver is changed to predominantly match a current received signal quality (at the receiver) for the particular frame being transmitted. Base station 104 will communicate during a control channel a modulation and coding level to each remote units 101-103 so that the remote units 101-103 knows how to demodulate the payload data. In one embodiment of the present invention, control data may also be transmitted with a link quality dependent modulation and coding rate. Thus, data transmissions with high quality are typically assigned higher order modulations rates and/or higher channel coding rates with the modulation order and/or the code rate decreasing as quality decreases. For those receivers experiencing high quality, modulation schemes such as 16 QAM, 64 QAM or 256 QAM are utilized, while for those experiencing low quality, modulation schemes such as BPSK or QPSK are utilized.

Multiple coding rates may be available for each modulation scheme to provide finer granularity, to enable a closer match between the quality and the transmitted signal characteristics (e.g., R=¼, ½, and ¾ for QPSK; R=½ and R=⅔ for 16 QAM, etc.). Base station 104 will determine the modulation/coding scheme utilized for a particular mobile based on its particular channel quality and other characteristics such as the Doppler speed or the target signal quality for the particular data transmission.

Figure 2:
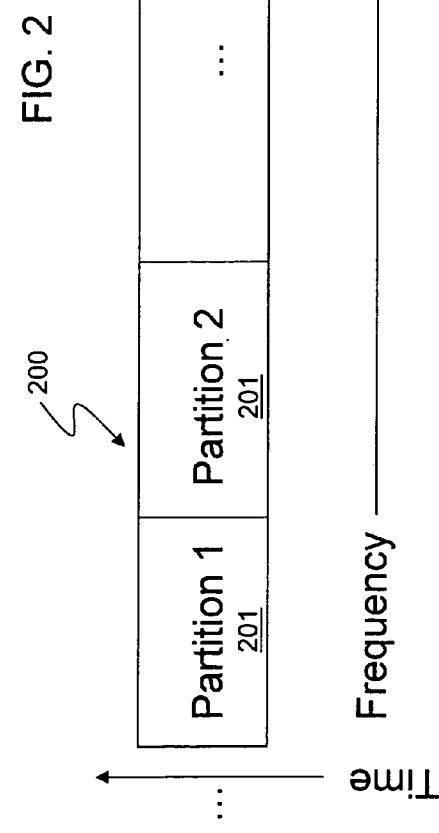
FIG. 2 illustrates a control-channel scheme.

FIG. 2 illustrates a control-channel transmission scheme that is utilized by communication system 100. Particularly, FIG. 2 illustrates control channel 200 being divided into N partitions 201, with the N partitions 201 equaling a single control channel frame. The control channel occupies one or more OFDM bauds. In other embodiments, the channel may occupy a frequency band for the frame duration or be code-multiplexed with the data for a CDMA system. During operation, base station 104 will group remote units 101-103 based on their received signal quality. Transmit power and encoding schemes for control information are allowed to vary for each group of remote units 101-103 and for different type of control information. Each partition has its own power level and encoding scheme, ordered with a monotonically non-increasing reliability level as the partition number increases.

For example, assuming that the same power spectral density and modulation scheme for all the partitions, partition 1 may be utilizing ⅛ rate encoding to transmit control information, while partition 3 may be utilizing ½ rate encoding. Control information for those remote units 101-103 experiencing poor reception (e.g. a low signal-to-noise ratio (SNR)) will be transmitted on partitions using lower (i.e., more robust) coding rates, while control information for those remote units 101-103 experiencing good reception (e.g. a high SNR) will be transmitted on partitions using higher encoding rates (i.e., less robust).

A remote unit 101-103 wishing to decode control information will receive the N partitions and decode the first partition ($P_1$). If $P_1$ is successfully decoded, an attempt to decode successive partitions takes place until all partitions in the frame are decoded or decoding fails for a particular partition. Information from all decoded partitions is assembled and control information is extracted from the assembled partitions. From the control information, the remote unit will be able to determine such things as resource allocations and downlink and uplink assignments.

Note that in the above process, the remote unit decodes all partitions it can decode, even those that possibly have no information for it. Alternatively, the remote unit can stop decoding after a determining that a partition has a control assignment for it, through, for example, finding its user ID or another ID associated with the user or user's traffic. Additionally, the parameters for decoding $P_1$ can be a priori known: for instance, they could be specified in the frame format, within initial signaling, in a superframe, etc. Alternatively, the encoding scheme can be estimated blindly from a very limited set of possible parameters. Finally, the modulation and coding scheme used on $P_i$ can be signaled in $P_{i-1}$ or could be blindly detected.

When the parameters for decoding $P_1$ are known a priori, the first partition $P_1$ may be a known size at a known location in the frame with a known modulation and coding scheme. $P_1$ can be used to send the information that must be decoded by all the remote units. Also, $P_1$ can contain a description of the structure of the PSCCH by indicating the location, size, modulation and coding scheme for other partitions, for example all the subsequent partitions or the next partition. $P_1$ may also be used to send a group of control messages for users in addition to partition configuration information. The first partition may be kept to a manageable size by not including user ID information indicating what partition the user should decode for control information; the partition configuration information allows for the decoding of all partitions (assuming channel quality is sufficient) for extraction any user-specific control information (typically identified with the user ID) within a partition.

In FIG. 2, the partitions may be representative of a physical mapping, such as partitions occupying contiguous subcarriers of an OFDM system as indicated. However, partitions may also be viewed as logical partitions, such that the control information is different than a physical mapping. For example, an interleaver may shuffle the partition information such that symbols from each partition are distributed over the resources for the control channel.

Figure 3:
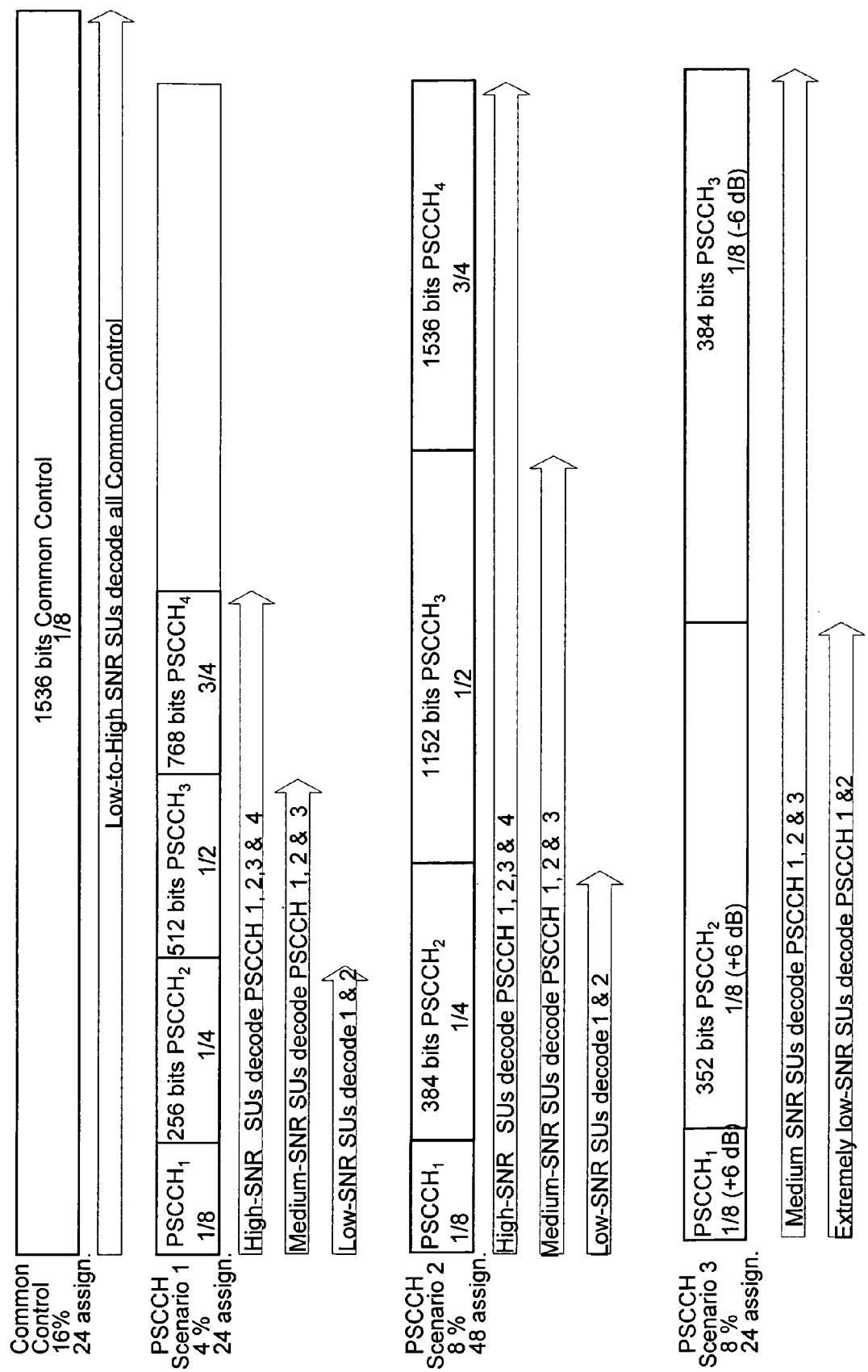
FIG. 3 is a more-detailed illustration of a control-channel scheme.

FIG. 3 is a more-detailed illustration of a control-channel scheme. As with FIG. 2, FIG. 3 may be representative of a logical or physical mapping. FIG. 3 shows how the partition structure improves the performance of the control channel when compared with the Common Control Channel. Each scenario shown in FIG. 3 has remote units (referred to as Subscriber Units (SUs)) with low SNRs decoding fewer partitions to retrieve their control information that those remote units having higher SNR levels. Thus, a remote unit with a low SNR may only decode the first two partitions, while those having better SNR levels may decode up to four partitions to retrieve their control information.

The first scenario illustrates that the PSCCH uses a quarter of the resources of the Common Control Channel while still being able to convey the same number of assignments, thereby reducing the control information overhead by 75%. With the common control channel structure all the assignment messages need to be sent with the same modulation and coding scheme typically chosen low in order to accommodate edge-of-cell users. With the PSCCH structure, the assignments are sent using a less conservative modulation and coding scheme, except for users that need that conservative modulation and coding scheme.

Alternatively, the PSCCH can be used as shown for scenario 2, i.e. the PSCCH uses half the amount of resources as the Common Control Channel, but carries twice as many assignments. This scenario occurs frequently when the system supports "fat pipe" scheduling or MIMO to enhance peak throughput. The third scenario is an extreme case where the PSSCH supports extremely low SNR users by utilizing power stealing from medium SNR users, by allocating fewer assignments in the frame. In this case, with the PSCCH structure, it is possible to serve users that could not be served with the Common Control Channel (or that would result in extremely high control overhead). In all cases, the PSCCH can be configured that some users might only decode $P_1$. As is evident, assignments for low SNR users occupy a much bigger portion of the frame than those for high SNR users. Because of this, only a few assignments for low SNR users can physically be scheduled in a frame. The signaling that need to be carried over the control channel is therefore also reduced for those frames.

For modern systems using multiple antennas, and advanced techniques such as frequency selective scheduling, it is anticipated that the amount of resources dedicated to the control channel will be significant. Therefore, using the PSCCH structure can increase system capacity by providing an enhanced control channel design that fits well the requirements from both the physical and the MAC layers.

Figure 4:
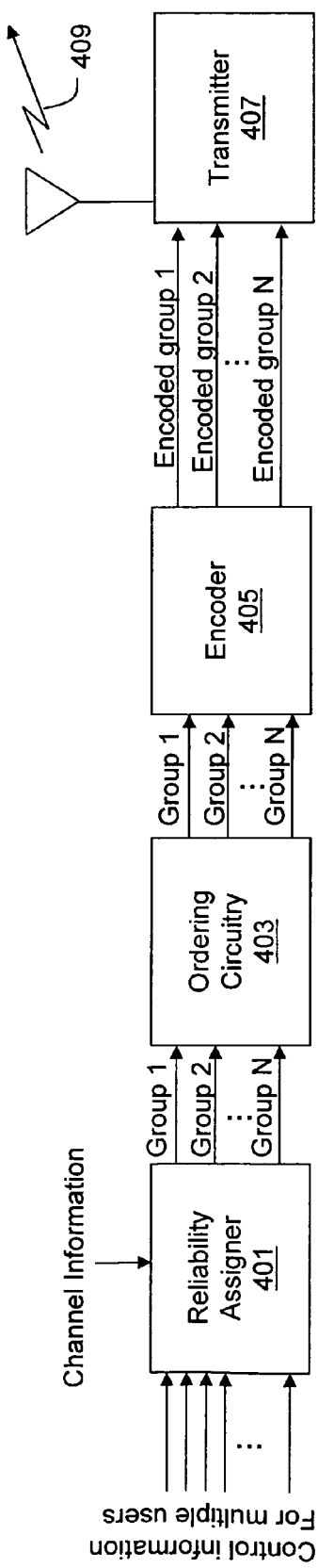
FIG. 4 is a block diagram of a base station performing control channel transmission.

FIG. 4 is a block diagram of a base station 104 of FIG. 1. As shown, base station 104 comprises reliability assigner 401, group ordering circuitry 403, encoder 405, and transmitter 407. During operation control information for multiple users is produced by base station 104. As discussed, control information comprises information such as, but not limited to resource allocations and downlink and uplink assignments. Control information enters reliability assigner 401. Reliability assigner 401 determines a reliability level for each message to be transmitted. Control information must be encoded robustly enough to be decoded at an acceptable error rate by each remote unit receiving an assignment in the frame. Thus, for remote units experiencing low SNR, a more robust encoding technique may be employed so that they can properly receive the control information. In a similar manner certain control messages may be deemed critical, and hence be encoded with a more robust encoding technique than non-critical control messages.

Regardless of the technique used for assigning reliabilities to control messages, reliability assigner 401 takes control messages and groups them into messages having substantially similar reliabilities such that the reliability needed for group i is greater than or equal to the reliability needed for group j, where i<j. Thus, control messages being transmitted to remote units having a low SNR will have group indexes lower than those being transmitted to remote units experiencing higher SNR levels. In a similar manner, more critical messages may be in groups having lower index numbers than non-critical messages. Depending on the number of groups (partitions), the number of total resources for control channel transmission, and the number of user's control channels (e.g., resource allocations) that must be provided, some users may be assigned to groups with a higher or lower reliability than desired.

Once control messages have been properly grouped, an error detection field (e.g., a cyclic redundancy check (CRC) bit) may be added for each encoded group before they enter encoder 405. Encoder 405 determines a transmission rate for each group and encodes each group into data symbols at a fixed encoding rate with an encoding algorithm which facilitates subsequent maximum likelihood decoding of the data symbols into data bits (e.g. convolutional or block coding algorithms). As discussed above, groups requiring a more-reliable transmission scheme may be encoded with a more-robust encoding scheme (e.g., ⅛ rate encoding), while groups requiring a less-reliable transmission scheme may utilize less-reliable encoding techniques (e.g., ¾ rate encoding).

The encoded groups then enter transmitter 407 where they are properly modulated and transmitted. The modulation of each group depends on the modulation required to meet the target reliability level. In one example, one group uses QPSK and another uses 16QAM. In other examples two groups may have the same modulation such as QPSK, with reliability (if different) distinguished by code rate, power level, repetition factor, or another transmission parameter. As discussed above, those groups that require a more reliable transmission scheme are transmitted earlier in the control channel frame.

Figure 5:
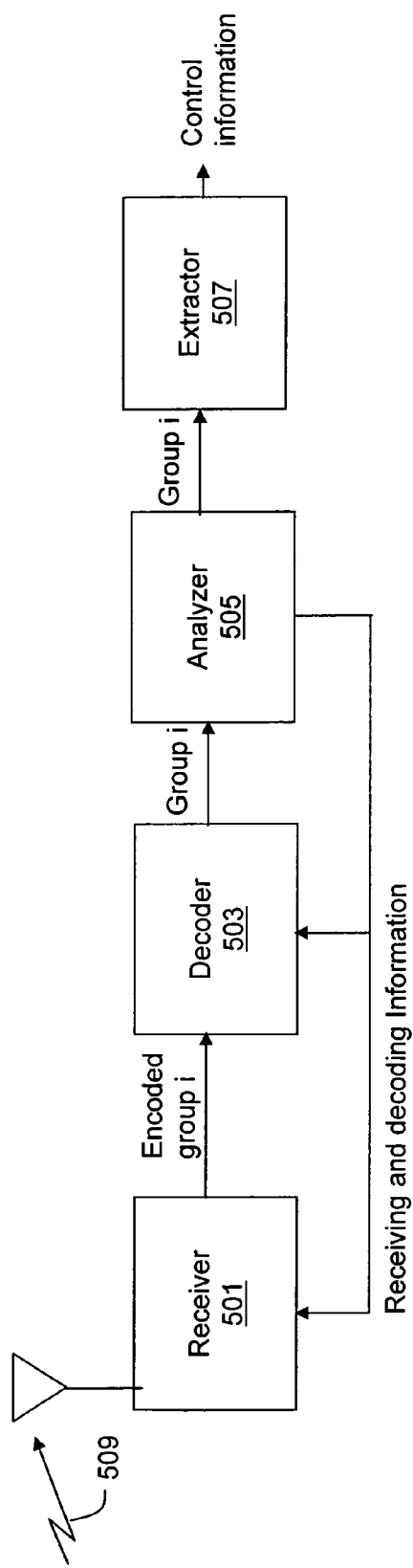
FIG. 5 is a block diagram of a receiver performing control channel reception.

FIG. 5 is a block diagram of a remote unit of FIG. 1. As shown, the remote unit comprises receiver 501, decoder 503, analyzer 505 and extractor 507. During operation, a control channel frame is received by receiver 501 where encoded groups of control information are successively appropriately demodulated. As discussed above, the modulation of each group depends on the modulation required to meet the target reliability level, and may be known a priori, signaled in an earlier or first partition, or blindly detected. Each group is modulated and encoded with potentially a differing modulation and encoding scheme, depending upon the criticality of the control message, or alternatively, depending upon the channel condition experienced by the receiver. Receiver 501 outputs the first encoded group to decoder 503 where it is properly decoded. Decoder 503 passes the decoded information to the analyzer 505. If the group has been successfully decoded (e.g. verified by checking the appended CRC), analyzer 505 requests receiver 501 and decoder 503 to process the next encoded group. This process is repeated until analyzer 505 detects that an encoded group failed to be successfully decoded or that all encoded groups have been decoded. If a group fails to be successfully decoded, subsequent groups could be decoded, though the probability of success will be low as the subsequent groups have the same or lower reliability.

As discussed above, a first decoding scheme is used to decode a first encoded group received over the first partition and a second decoding scheme is used to decode a second encoded group received over the second partition. A first and a second modulation scheme are used to demodulate the first and the second groups if the modulation scheme varies among groups. In a preferred embodiment, the receiving and decoding information for the encoded group i am carried out in the encoded group i−1. In an alternate embodiment, the receiving and decoding information can be known a-priori based on the frame format.

FIG. 6 is a flow chart showing operation of the base station of FIG. 3. The logic flow begins at step 601 where reliability assigner 401 receives a plurality of control messages for a plurality of remote units. As discussed above, these messages are produced by the base station and comprise such information as how to demodulate the payload data. At step 603 a reliability level for each control message is determined. As discussed above, the reliability level for a particular message is preferably dependent upon the SNR experienced by the remote unit receiving the message, however, alternatively the reliability level for a particular message may be dependent upon how critical the message is perceived to be, with critical messages being assigned a higher reliability level.

At step 605, ordering circuitry groups control messages having a similar reliability level to produce a plurality of grouped messages. These group messages are output to encoder 405 where each group is properly encoded (step 607). As discussed above, at least two groups are encoded with a different encoding scheme, with those groups having a higher reliability level will be more-robustly encoded than those groups having a lower reliability level. The encoded groups are passed to transmitter 407 where an order for transmission is determined (step 609). As discussed, those encoded groups with a higher reliability level are transmitted prior to those having a lower reliability level. In an alternate embodiment of the present invention information may be placed by encoder within each group that indicates an encoding scheme for subsequent groups. The encoder may additionally place a CRC field within each encoded group. Finally, at step 611 the encoded groups are transmitted in the determined order over the control channel. As discussed above, each group may be transmitted at differing power levels, where a sum of power per encoded group over the frame remains fixed. Additionally, the control-channel bandwidth may remain fixed.

FIG. 7 is a flow chart showing operation of the remote unit of FIG. 4. The logic flow begins at step 701 where a control channel transmission is received. As discussed above each frame of the control channel is partitioned into groups with at least two groups having differing encoding, modulation, and/or power levels. A fixed number of modulation symbols exist per control-channel frame with the control channel preferably having a fixed frequency. At step 703 a first encoding scheme is used to decode the first group of messages. As discussed above, the encoding scheme for the first group may be universally know beforehand, with the encoding scheme used on group $P_i$ is signaled in group $P_{i-1}$.

At step 705 it is determined if the first group of messages where properly decoded, and if so the logic flow continues to step 707 where the next group of messages is decoded. If, however, the first group of messages where not properly decoded, the logic flow ends at step 713. At step 709 it is determined if the next group of messages were properly decoded, and if so, the logic flow continues to step 711. At step 711 it is determined if there are any more groups to decode in the frame, and if so, the logic flow returns to step 707, otherwise the logic flow ends at step 713 where any control messages for the remote unit are processed.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method comprising the steps of:
   producing a plurality of control messages in an OFDM communication system that need to be transmitted to a plurality of remote units within a control channel shared among the plurality of remote units within a frame in the OFDM system, wherein the control channel comprises time and frequency partitions occupying a plurality of subcarriers on one or more OFDM bauds of the frame;
   determining a reliability level for each control message, the reliability level including a combination of a channel coding rate, modulation, and transmission power level;
   grouping control messages for the plurality of remote units having a similar reliability level to produce a plurality of grouped control messages;
   encoding each group wherein two of the groups are encoded with a different encoding scheme; and
   transmitting the encoded groups on the plurality of partitions of the control channel within the frame in the OFDM system wherein symbols from the partitions are interleaved to be distributed over the subcarriers for the control channel.

2. The method of claim 1 wherein a partition comprises one encoded grouped control message.

3. The method of claim 2 wherein the encoded grouped control messages on the partition includes a location or size for another partition.

4. The method of claim 2 wherein the encoded grouped control message on the one partition is encoded with a known modulation and contains partition configuration information of the control channel.

5. The method of claim 1 wherein a control message comprises a Resource allocation and/or Downlink assignments and/or Uplink assignments and/or a modulation and coding level of payload data for a remote unit.

6. The method of claim 1 wherein the step of transmitting the encoded groups comprises the step of transmitting the encoded groups at various power levels.

7. The method of claim 1 wherein the step of encoding each group comprises the step of encoding each group wherein the encoding scheme used on grouped control message on partition $P_i$ is signaled in a grouped control message on partition $P_{i-1}$.

8. The method of claim 1 wherein the step of encoding each group comprises the step of encoding the groups such that a first group has known encoding scheme with a known location and a known size wherein the first group contains partition configuration information of the control channel.

9. The method of claim 1 further comprising the step of placing information within a first group ($P_1$) that indicates an encoding scheme for other encoded groups.

10. The method of claim 1 further comprises the step of determining an ordering for transmission of the encoded grouped control messages based on the reliability level of the encoded groups.

11. The method of claim 1 wherein the step of determining the reliability level for each message comprises the step of determining a reliability level based on a channel quality for the remote unit that is to receive the message.

12. An apparatus comprising:
    a reliability assigner receiving a plurality of control messages in an OFDM communication system that need to be transmitted to a plurality of remote units within a frame of a control channel, and determining a reliability level for each control message, the reliability level including a combination of a channel coding rate, modulation, and transmission power level;
    an encoder encoding each group wherein two groups are encoded with a different encoding scheme, and each group contains multiple control messages for the multiple remote units; and
    a transmitter determining an order for transmission of the encoded groups and transmitting the encoded groups to the multiple remote units on a common control channel shared among the multiple remote units.

13. The apparatus of claim 12 wherein the encoded groups are transmitted at various power levels.

* * * * *